United States Patent [19]

Monzini

[11] 4,168,732
[45] Sep. 25, 1979

[54] VEHICLE TIRE AND WHEEL CONSTRUCTION WITH CONTROLLED DEFORMATION

[76] Inventor: Renato Monzini, 16, Via Conte Verde, Milan, Italy, I-20158

[21] Appl. No.: 807,660

[22] Filed: Jun. 17, 1977

[30] Foreign Application Priority Data

Jun. 23, 1976 [IT] Italy ............................... 24618 A/76
Dec. 10, 1976 [IT] Italy ............................... 30289 A/76

[51] Int. Cl.² .......................................... B60C 13/00
[52] U.S. Cl. ..................... 152/353 R; 152/209 WT; 152/352 R; 152/379.2 D; 152/398
[58] Field of Search ....... 152/209 WT, 352 R, 352 A, 152/353 R, 353 C, 354, 362 R, 379.1, 396, 397, 398, 409, 379.2, 401

[56] References Cited

U.S. PATENT DOCUMENTS

| | | | |
|---|---|---|---|
| 1,337,660 | 4/1920 | Killen | 152/209 WT X |
| 1,842,219 | 1/1932 | Trautman | 152/352 R X |
| 1,885,901 | 11/1932 | Ennis | 152/379.2 X |
| 2,440,804 | 5/1948 | Lyon | 152/353 R X |
| 2,868,262 | 1/1959 | Straussler | 152/401 |
| 3,631,913 | 1/1972 | Boileau | 152/353 R |
| 3,765,468 | 10/1973 | Verdier | 152/352 R |
| 3,916,968 | 11/1975 | Masson | 152/353 R |
| 3,918,506 | 11/1975 | Marzocchi | 152/354 X |
| 4,067,374 | 1/1978 | Alden et al. | 152/353 R |

FOREIGN PATENT DOCUMENTS

| | | | |
|---|---|---|---|
| 595163 | 4/1934 | Fed. Rep. of Germany | 152/396 |
| 1059542 | 3/1954 | France | 152/209 WT |

*Primary Examiner*—Randolph A. Reese
*Attorney, Agent, or Firm*—McGlew and Tuttle

[57] ABSTRACT

An improved tire and wheel for road vehicles, the tire being either of tubeless or inflatable tube arrangement and of the radial and belted type and includes flexurally deformable tire side walls. The improvement comprises side wall restraining annular members for localizing a side wall flexural deformation to an annular portion of the sidewall to provide a material decrease of the tire flattening amplitude under load. The tire tread may include apex-shaped extensions on either side thereof which are integral with the belt and tread containing perimetrical portions of the tire carcass to laterally widen the road/tire contact interface area and structure for improving the load carrying and handling characteristic of the tire.

8 Claims, 20 Drawing Figures

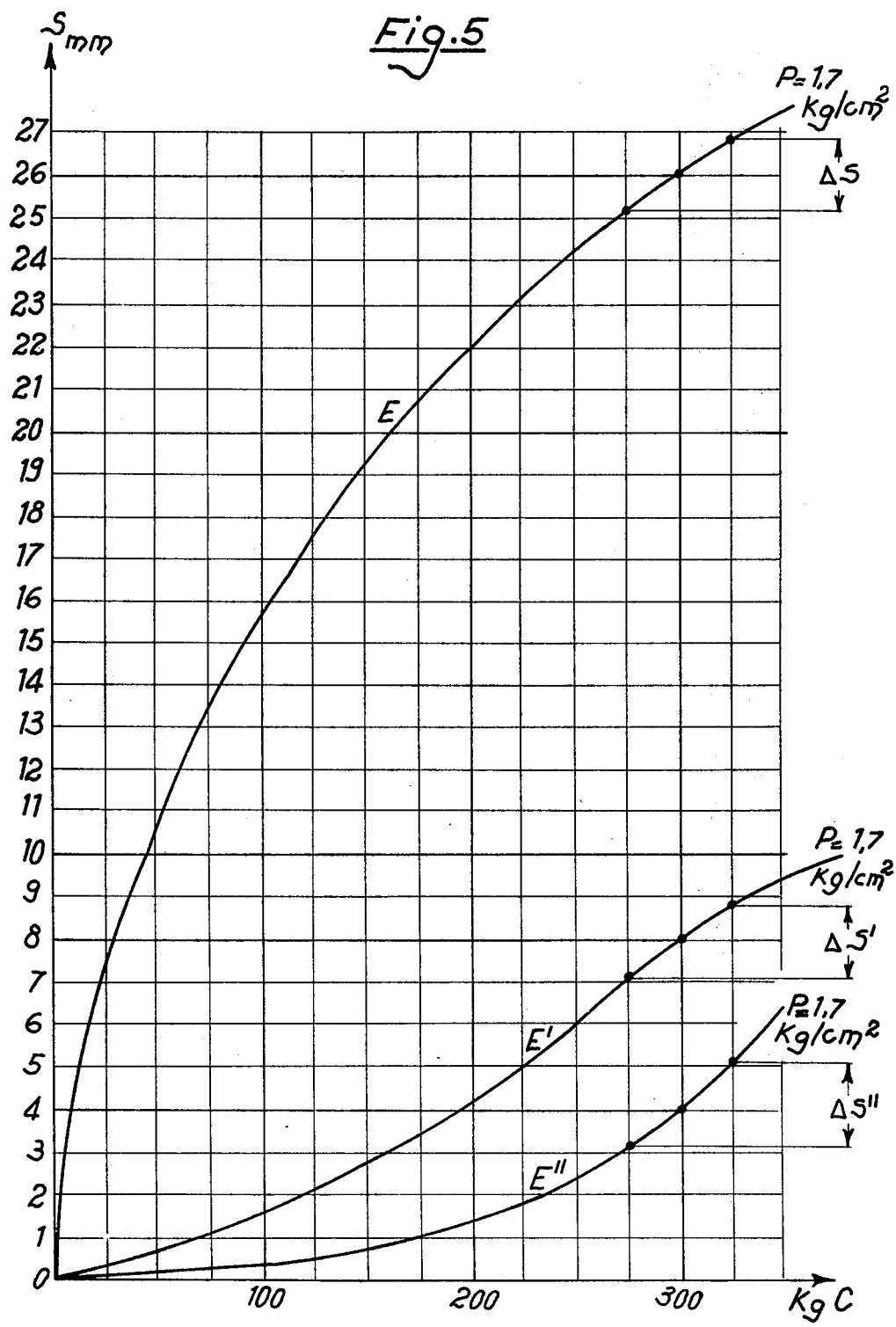

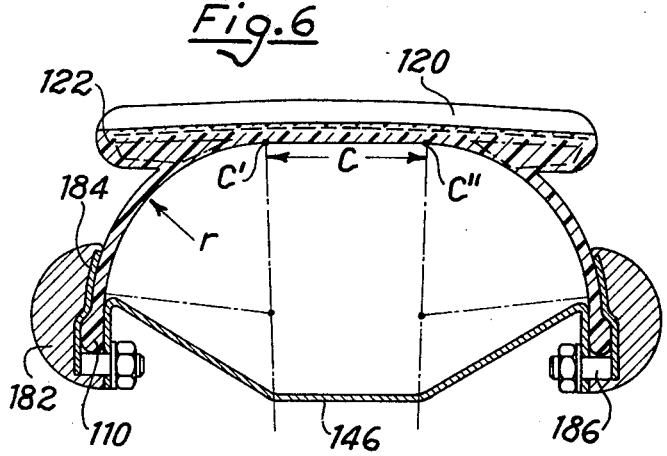
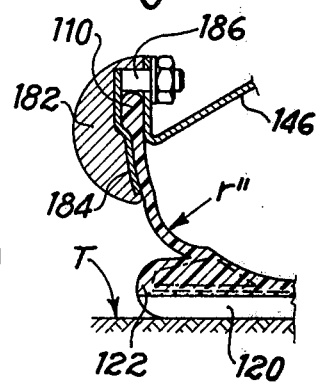
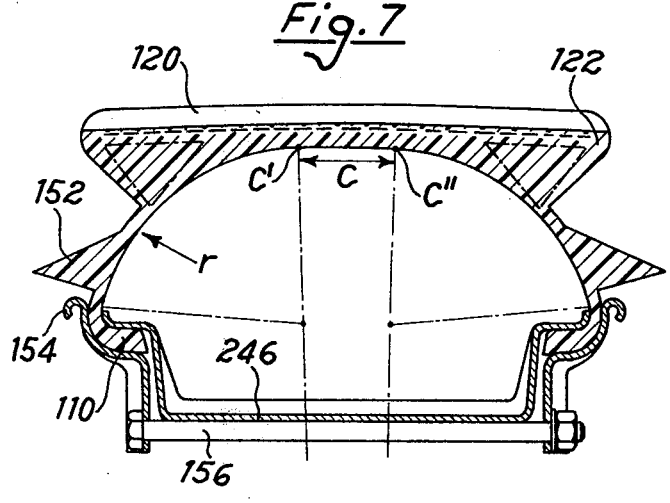
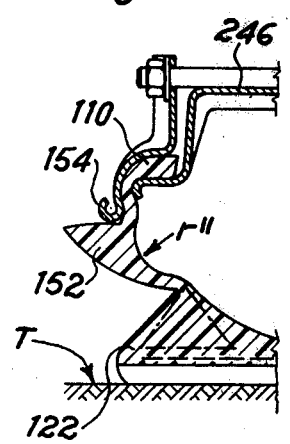
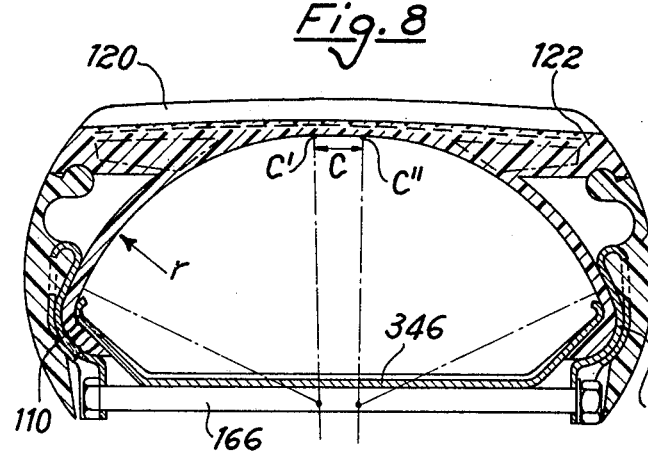
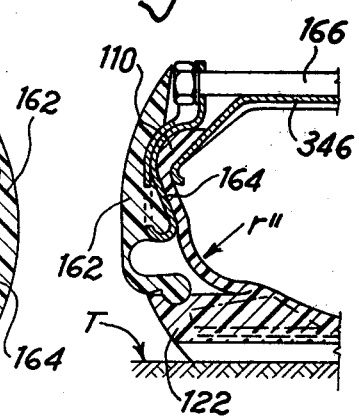

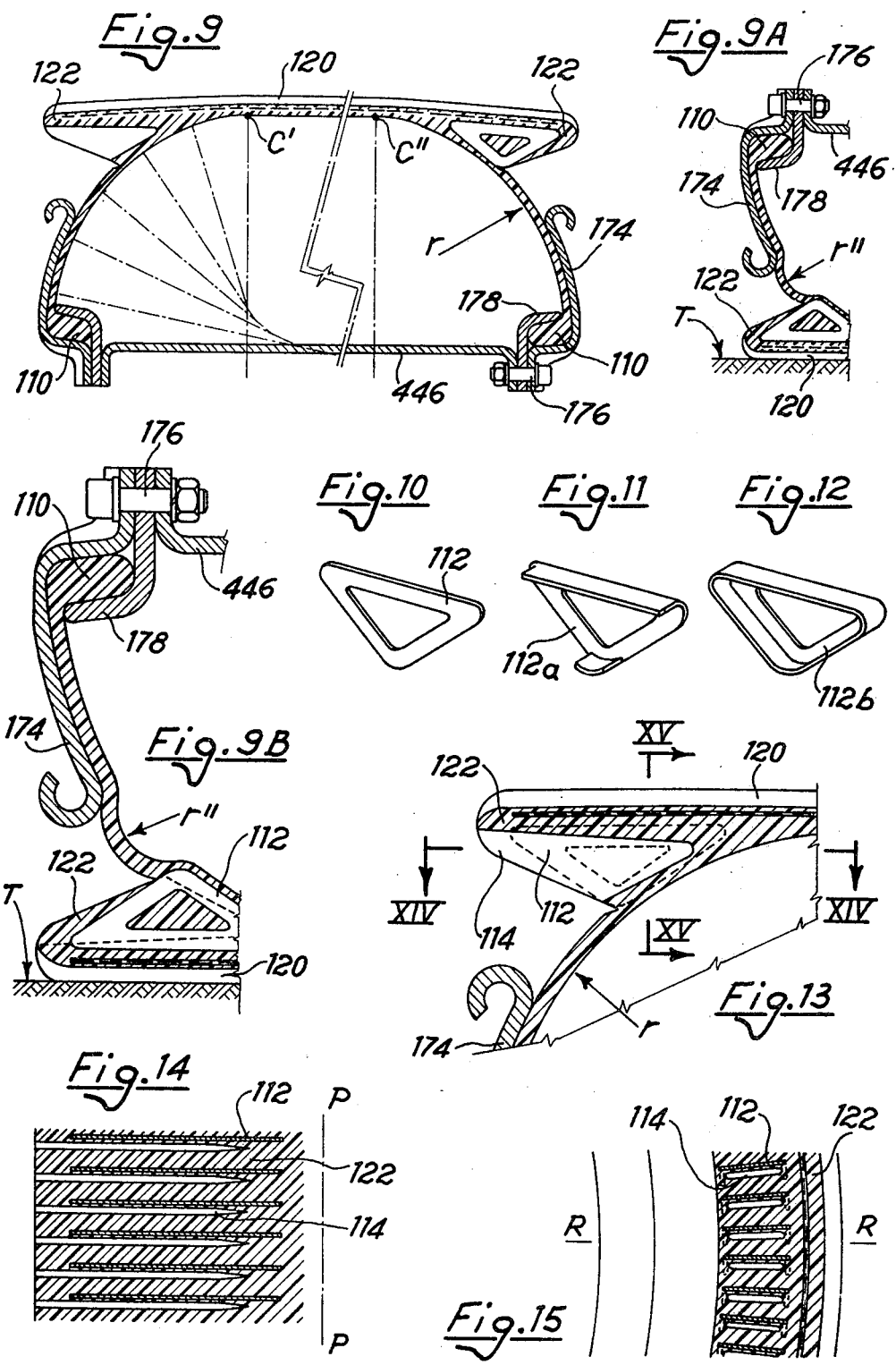

VEHICLE TIRE AND WHEEL CONSTRUCTION WITH CONTROLLED DEFORMATION

BACKGROUND OF THE INVENTION

This invention generally relates to tire and wheel constructions for road vehicles and a particular object thereof is to provide an improved wheel which is fitted with a tubeless or tubed tire having a lower rolling friction coefficient and thus a lower resistance to forward movement of a car equipped with the invention.

Problems pertaining to the decrease of rolling resistance in tires and wheels, which is essentially caused by the work dissipated due to the deformation of the carcass and in general of the pneumatic structure of the wheel, have long been thoroughly considered by this applicant. The study has involved singling-out and analyzing the conditions by which such resistance is caused.

In particular, considerations pertinent to phenomena and to conditions associated with the deflection of a loaded tire on the ground and to deformations brought about therein, can be found in U.S. Pat. No. 3,830,272 granted to the applicant on Aug. 20, 1974. Further proposals by this applicant concerning the problems can be found in U.S. patent application Ser. No. 749,664 filed on Dec. 13, 1976 now abandoned, wherein a particularly advantageous geometry of a tire cross-section in the radial plane (i.e. in the planes wherein the wheel axis is contained) is disclosed and commented on.

The phenomena occurring in tire deflection are very complex and therefore will be summarized hereinafter as far as it is needed for a better understanding of the invention. An important parameter is the change of the tire side wall curvature under load. In particular, the carrying capacity of the tire can be rationally expressed in terms of the difference $r-r''$, wherein $r$ is the maximum radius of multi-center curvature by which the non-deflected unloaded tire side wall is defined, while $r''$ is the maximum radius of multi-center curvature by which the portion of the side wall which is free to deflect under load, is actually deflected.

It is moreover apparent that a good rolling friction coefficient of a tire and wheel is, generally speaking, in inverse ratio to the parasitic resistances standing in the way of the rolling. These resistances increase proportionally with the tire deflection which, as is well known, is measured in terms of the tire radius change with equality of load and inflation pressure, hereinafter simply called "deflection".

The tires of this invention are those of the so called "radial" class, i.e. comprising a structure formed by a plurality of flexible but inextensible elements (the so called "cords") which extend between the tire bead reinforcing steel wires and exactly or even approximately lie in as many radial planes. Moreover, the tires of this invention are also of the "belted" class, i.e. a practically inextensible belt is fitted in their carcass on either side of equatorial or symmetrical planes of the tire and wheel (i.e. the major plane perpendicular to the wheel axis). As is well known, such belt acts as a "containing means" for the tire perimetrical portion, standing against the tires inside pneumatic pressure. Such an annular perimetrical portion which in the conventional tire practically underlies the tread, and has a width usually smaller than that of the tread, will be called hereinafter for disclosure convenience the "contained zone". The term "tire side wall" will identify, in conformity with the wording utilized in the art, the tire side portions defined between the beads and the contained zone, such side wall being in the conventional technique the most flexurally deformable part of the whole tire, i.e. those wherein a large decrease in the local bending radius occurs when the tire is deflected against the ground under a load action.

SUMMARY OF THE INVENTION

A general purpose of this invention is to provide an improved tire and wheel construction, mainly characterized in that they show, when loaded, a "capacity/deflection" ratio much greater than that attainable in the conventional tires, with consequent great advantage for the smooth running of the structure and practically without prejudicing all other essential considered factors, as e.g. a comfortable and safe ride.

The above stated improvement in its broadest meaning is characterized by an association with a tire and wheel and in particular with at least a part of a tire wall, of essentially rigid structural components which stand against the side expansion or bulging of the side wall, thereby restraining the deformability of tire radial sections to selectively localized portions thereof (and additionally ensuring further important actions and effects, as more specifically stated later on).

By using restraining side means or structures (hereinafter called "deformation restrainers") by which the side wall is compelled to deflect, i.e. to take a smaller bending radius, in a portion smaller than their whole height, particularly important and interesting effects can be attained. A greater difference $r-r''$ for example is obtained with an equality of total deflection of the loaded tire. Therefore, with an equality in carrying capacity, a smaller deflection is obtained.

On the other hand, the load which can be supported by a wheel and tire is proportional to the area of its surface momentarily in contact with the ground, which is termed the tire "print". The area of this print is in turn proportional, with suitable corrective coefficients, to the product of its longitudinal dimension, i.e. the chord of the peripheral circle which is caused by the deflection, by its crosswise dimension or width of tread into contact with the ground. The pressure at which a tire is to be inflated to stand against a given load, is in turn inversely proportional to the print area.

This invention also consists of the further development of previously stated teachings and is directed to a further purpose of providing an increased width to the tire, while preserving all advantages offered by the particular geometry of radial sections, as disclosed in the above mentioned U.S. patent application filed Dec. 13, 1976 along with the advantages which can be obtained from making use of restraining means which are in turn a distinctive feature of this invention.

According to this further aspect of the invention, the improved tire and wheel is essentially characterized in that it comprises in its radial sections side extensions, essentially coplanar with the tread and forming parts thereof, having the essentially inextensible belt there, which is materially widened over its previously considered contained zone.

In other words, the isosceles trapezium geometry according to the above stated patent application, having its outer basis identified with sections of a contained zone and the sides identified by lines joining the contained zone ends with the tire beads, is now modified in the sense that the outer basis of the trapezium is bilaterally lengthened on either side beyond the belt contained zone.

For a better understanding of the invention, the contained zone will now be considered between the points (that is the circles, when the whole circular development of the tire is considered) wherein the belt is separated from the structure consisting of the flexible but inextensible cords lying in radial planes. For simplicity and convenience of disclosure, the whole tire carcass may be considered as being subdivided into a "radial carcass" (formed by the whole of the radial cords extending between the tire beads) and a perimetrical belt" adjacent to and firmly connected with the radial carcass in a more or less wide equatorial portion by which the contained zone is defined. In the geometry of the improved tire, the side walls comprise segments (more precisely arcs) extending in the radial carcass between the tire beads and the points at which the radial carcass is connected to the belt. Consequently, the means by which the deformability of the sidewall arc is limited, act to prevent the deformability of at least a part of the side wall arc, which part may be adjacent the tire beads or near the contained zone or even may comprise "inner" portions adjacent the beads and "outer" portions adjacent the contained zone. The flexural deformability is concentrated in the latter case in a portion or intermediate part of the side walls spaced both from the beads and the contained zone, whereby to ensure an even greater difference $r-r''$.

The side extensions of tread and of belt (which in the radial sections may be termed "apexes" and so hereinafter defined) are advantageously joined by suitably inclined lines with the side walls. Therefore such apexes have a cross sectional configuration which may be inscribed, as a rule, in a polygonal contour, a side of which identifies a part of the tread outside the contained zone. The load weighing on the ground is transmitted through the said apexes sections to the tire air tube, wherein the required pressure is maintained. For ensuring a correct distribution of load across the adjacent portion of radial carcass, it is expedient to locate a material, composition or structure in the said apex inner sections which is capable of conforming to the tread deformations in a perimetrical direction but which resists compression in the radial planes. A few technical solutions conceived to obtain these effects and conditions will be disclosed later.

The belt surface development which extends into the apexes along with good tire stability, ensured by the geometry of its radial sections, allows the use of containing belts which are lighter and more flexible than the conventional ones, with the advantage of a localized deformability and capacity to take-up shocks against obstacles, such as stones and the like.

The apexes constituting the side extensions form restraining means of flexural deformability of the outermost portions of tire side walls, according to the previously stated feature.

An improved tire as above stated necessarily comprises on its side walls, circular recesses between the extensions and the side wall portions adjacent thereto.

These recesses may be provided with side rings of elastomer material which may form a protection against contact and grazings, such protective elements that may advantageously cover the metal restrainers being already foreseen in the U.S. patent application filed Dec. 13, 1976.

The above and further, more specific features of the invention will be disclosed in the following detailed description of non restrictive embodiment forms thereof, with reference to the accompanying drawings.

BRIEF DESCRIPTION OF THE DRAWINGS

FIG. 5 is a graph showing comparative curves of the courses of deflection under load in conventional and the inventive tires, as a function of static load, to show advantages of the invention.

FIG. 6 is a sectional view taken on a radial plane of another embodiment of the invention, with some structural simplifications, as required by the small figure scale.

FIG. 6A is a fragmentary side view of the tire of FIG. 6 in the deflection condition under load.

FIGS. 7 and 7A are similar to FIG. 6 and 6A respectively and show a modified embodiment of the invention with side walls formed with annular protective projections jutting out of the narrow, not flexurally limited, intermediate zone, with a modified embodiment of a base rim therefor.

FIGS. 8 and 8A are similar to FIGS. 6 and 6A and show another modified embodiment of the invention fitted with side closing and protective rings.

FIGS. 9 and 9A are similar to FIGS. 6 and 6A and show a further modified embodiment of the invention, wherein the apexes of the tire comprise inner reinforcing and stiffening elements located in radial planes.

FIG. 9B shows in a larger scale and in more detail the same object of FIG. 9A, deflected under load.

FIGS. 10, 11 and 12 respectively show modified embodiments of the elements that may be inserted within the apexes of the embodiment of FIG. 9, as formed by the side extensions.

FIG. 13 shows on a larger scale a radial section of a detail of FIG. 9, corresponding to a plane wherein a notch is formed.

FIGS. 14 and 15 are cross-sectional views taken on the planes XIV—XIV and XV—XV respectively of the tread apexes of FIG. 13.

DESCRIPTION OF THE PREFERRED EMBODIMENTS

According to one aspect of the invention, the improvement resides in having a tire with means by which the deflection in the side walls of the tire is restrained to obtain an appreciable difference between the unloaded side wall radius r and the loaded radius $r''$ of the side wall portion which is free to deflect.

Figure 1:
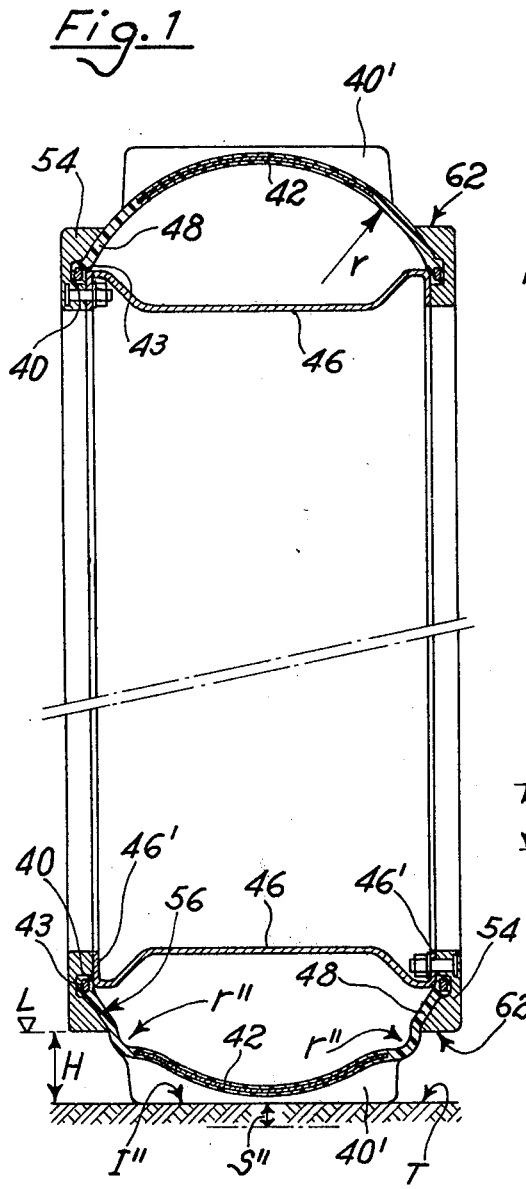
FIG. 1 is a cross-sectional view taken along a radial plane of one embodiment of the invention, as applied to a tire having a special lowered profile, essentially according to the applicant's proposal contained in the U.S. patent application Ser. No. 749,664 of Dec. 13, 1976.

As generally seen in FIG. 1, deformation restrainers 54 in the invention are designed to prevent the lateral deflection or bulging of the tire side walls.

These deformation restrainers consist of essentially rigid circular bodies (preferably but not necessarily of metal) associated with the tire side walls, and connected either to the tire or, alternatively, to the base rim, of a wheel that carries the tire. The restrainers 54 are shaped in such a manner as to counteract outward lateral deformation of the side walls in order to stabilize the curvature thereof. The outer radius of the deformation restrainers is smaller than the maximum radius of the tire by an amount required to avoid any contact of the restrainers with the ground.

Further advantages can be obtained when the invention is carried into practice in association with a wheel fitted with a tire having a special lowered section of the type disclosed in the above mentioned U.S. Patent Application filed Dec. 13, 1976 and as exemplified in FIG. 1. This embodiment also exemplifies the connection of deflection restraining rings 54 with suitably shaped side edges 46' of metal base a rim 46 of the wheel. This ring 54 is adapted to the special low profile tire cross-section. In this example it is anticipated that the restraining rings 54 be formed on their inner sides, in addition to shaped portions 56 which restrain the outwardly directed deflection of tire side wall initial portions 48, also with recesses wherein the tire beads 40, made inextensible by the conventional steel wires 43, are accomodated and anchored.

The deflection under load of the tire portion in a direction outwardly of the contour 62 of restrainers 54, results in an essentially flexural deformation of an arc including a belt 42 in the tire and in the formation of side portions having a very small bending radius r". This type of structure, in which deformation under load is selectively localized by restrainers 54 allows for a very small deflection S" along with a satisfactory specific load at the interface I" between the ground T and the tread 40', advantageously having a flat cross-section when the tire is not loaded (upper half of FIG. 1).

In the case where the invention is applied to the improvement of tires having essentially conventional radial design, recourse can be made to many different technical solutions, in addition to that disclosed in FIG. 1. Such technical solutions are exemplified in FIGS. 2 to 4.

Figure 2:
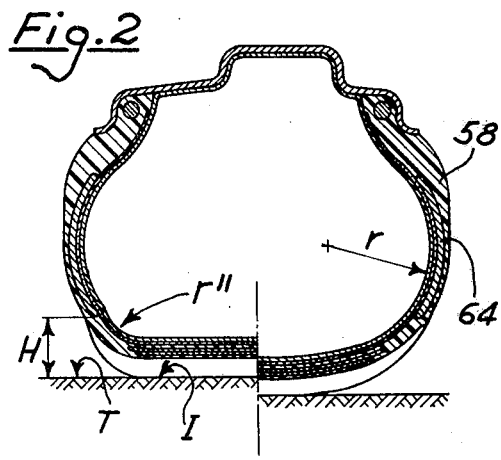
FIGS. 2 to 4 are cross-sectional views taken on either side of equatorial symmetry planes, of modified embodiments of the invention having deformation restrainers in the elastomeric structure of the tire carcass showing the tire in a loaded and unloaded condition.

In the example of FIG. 2, the deformation restrainers consist of preferably metal rings 64 having an arc of circular shape which conforms with the original curvature of the tire side walls 58, wherein the rings 64 are wholly embodied. This structure may be used without adverse effects on any other critical condition of the invention, including the minimal distance H between the lower edge of the restrainers and the ground T when the tire is deflected (left part of FIG. 2) with a deformation selectively limited to portions extending between the outer side of restrainers and the flattened portion at the interface I between the tread and the ground.

Figure 3:
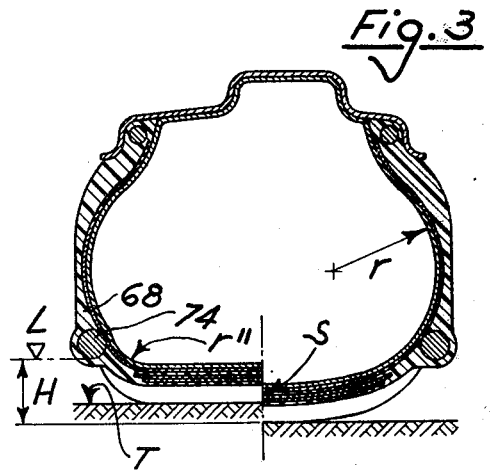

In the embodiment of FIG. 3, the deformation restrainers show the structurally simple shape of essentially rigid rings 74, having a circular cross-section. The cross section of rings 74 may be different in other embodiments but the rings are always imbedded in the carcass side walls 68 at the level L where it is intended to selectively separate the free side wall portion from the restrained one.

Figure 4:
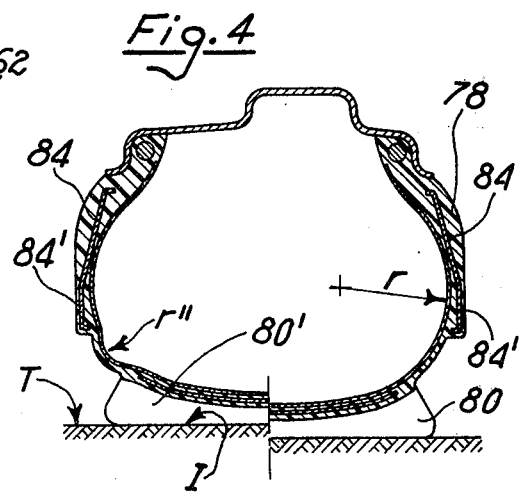

An embodiment of the restraining rings 84 is shown in FIG. 4, wherein the rings, made of blank and drawn metal sheet, are largely embodied in the initial portions of side walls 78 but project out therefrom with their outermost portions 84' to allow the resulting outer portion of the tire sides that can be deformed with a small bending radius r" to be further bent toward the inside of tire in the case of a localized concentration of load on very rough or very irregular ground. In FIG. 4 the tire is shown in combination with another feature of the invention. That is that a tread 80 is shown with a divaricate shape, which has a cross-section under load that tends to become wider, as denoted by 80', whereby to form a greater print surface at the interface I and thus to obtain advantageously reduced specific loads on the ground T with an equality of inflation pressure as compared to other tire designs.

According to conventional technical knowledge, the increment of deflection typically caused by transient or dynamic loads on a tire, is in a first approximation inversely proportional to the pressure in the tire. On the other hand, the running comfort of a tire is enhanced by its ability to absorb by deflection, the transitory and local roughness of the ground and in general to absorb all dynamic loads. Considering that a typical feature and an essential advantage of the improvement according to the invention is that for an equal static load, a smaller flattening of the tire results than with the same load applied to a conventional tire, it would be logically forseeable that under added transient and dynamic loads the inventive tire would undergo further smaller flattenings. On the contrary, the graph of FIG. 5, given as an example only, shows, in respect to a tire having a conventional structure, the surprising and advantageous course of flattening, as a function of load for a given pressure, in the range of transient loads on a tire.

The curves E, E' and E" of this graph respectively show the values and the increments of deflection of a conventional tire and of two improved tires according to the invention. The curves assume an inflating pressure of P=1.7 kg/sq.cm., i.e. the pressure usually adopted for inflating the tires of a mid-size car. A progressive decrease occurs in the slope of curve E with increasing load C, and a deflection S of 26 mm is indicated for a usual load C of 300 kg.

To obtain a satisfactory taking-up of transient loads, of e.g. ±25 kg., it is assumed that a tire should undergo positive and negative variations of at least plus or minus one millimeter in respect of static deflection, i.e. a ΔS of an order of 2 mm. or of about 1/13 of static deflection. This deflection is required to meet a comfort condition.

The curve E' shows that an improved tire according to the invention (see FIGS. 2, 3 and 4) attains its condition of static carrying capacity of a load C of about 300 kg when the deflection S is about 8 mm, while maintaining its capacity of transient deflection ΔS' of about 1.8 mm. The improved tire having the special lowered profile of FIG. 1 (curve E") will attain its stabilized condition under a static load of 300 kg. when the deflection S is about of 4 mm, ensuring however the required comfort owing to a range of transient deflection changes ΔS" of about 2 mm.

The curves E' and E" which are typical of the improved tire, sharply differentiate from the curve E which is typical of conventional tires for the large increase in their slopes at the initial values of load (i.e. they show positive second derivatives), whereupon a stabilization, when not a reversal of curvature sense, occurs at the nominal service load for the tire.

The second but equally important aspect of the invention shown in the tread shape 80 of FIG. 4 will be now thoroughly considered and discussed. When considering such aspect, as shown in particular in the embodiments of FIGS. 6 to 15, it is expedient to remember a few conditions which are specifically pertinent to this second aspect and the related inferences which constitute the premises on which this invention is based.

In the embodiment form of said FIGS. 6 to 15, the wheel and tire comprises, as shown in FIGS. 1 to 5, a radial carcass formed by a plurality of cords that extend between the two beads (denoted by the numeral 110 in each embodiment) which are to be secured to either side of the metal rim of a wheel which, in particular, in view of the specific features of structure and geometry of the tire, can be designed in conformity with many different advantageous technical solutions, some of which are shown in FIGS. 6 to 15. The shape of each section taken in the radial planes, i.e. the planes wherein the wheel axis is contained, is determined by the different equilibrium and settlement conditions, with no load on the wheel, between in the inner pressure and the structure (more or less locally stiffened) of the carcass, of the elastomeric mass and of possibly present stiffening resisting elements associated with the tire, as previously stated.

An essential component of the tire carcass is the perimetrically inextensible belt, diagrammatically shown by dash lines in FIGS. 6 to 9, by which the containing action of the perimeter of tire is exerted. Such a belt is adjacent to and firmly connected to the perimetrical zone or band of the radial carcass, thereby establishing a contained zone C in FIGS. 6, 7 and 8. Contrary to conventional technique, according to which the belt can be considered as associated and physically connected with the radial carcass across the whole width thereof, in the tire according to the invention the belt is extended on both lateral sides beyond the zone C and embodied within apex portions 122 which may be of different sectional shape and may be also stiffened. This is needed so that the apexes can stand against compression in the radial planes, while maintaining a sufficient flexibility in their circular development.

In the contained zone C the tire is flat, or more precisely, it shows a very large bending radius. The tread 120 in the different figures follows as a rule the course of zone C and extensions on either side thereof.

In the novel tire according to the invention, the conventional term "tire wall" is substantially inappropriate. This term shall be used to refer to portions of the tire extending between the points C' and C'', by which the limits of contained zone C are defined, and the beads 110.

The most flexually resilient portions of the tire are included in these side walls, the inner surface of such side wall portions being the shape of an arc of a circle with an average bending radius r (actually, the inner curvature of the side wall is not exactly equal to an arc of a circle, but shows a geometrically more complex shape, as shown in the left half of FIG. 9).

In conformity with what described with reference to FIGS. 1 to 4, at least a portion of the side wall is associated with an essentially rigid structural annular components which preferably are firmly secured to the metal rim of the wheel. The restraining means can be designed according to different technical solutions. Thus in FIGS. 6 and 6A for example this means consists of essentially flat rings 184 connected by bolts 186 to either side of rim 146, thus anchoring the tire beads 110.

In the example of FIGS. 7 and 7A, the restraining means consist of suitably shaped rings 154 that are tightened against tire beads 110 by the rods 156 and against the suitably shaped sides of rim 246 thus firmly connecting the beads 110 which in this case show an angled geometry.

In the example of FIGS. 8 and 8A, the lateral restrainers 164 are tightened by tie rods 166 against the diverging sides of rim 346, thereby tightening the beads 110 in an oblique angled space.

In the embodiments of FIGS. 9 and 9A and 9B, lateral restrainers 174 are connected, e.g. by bolts 176 (or alternatively by rods of the type shown in FIGS. 7 and 8) to the rim 446, intermediate angled metal rings 178 which are interposed therebetween for tightening the beads 110. The embodiments of FIGS. 6–9 are particularly advantageous for manufacturing tubeless tires, because they ensure an airtight seal in a particular efficient way. Note that the curvature of the inner surface of restrainer 174 is concave and conforms to the unloaded radius r of the sidewall to cause uniform abutment between the restrainer and sidewall.

A deformation portion of the sidewall in each embodiment is thus defined between the restraining members in each case and the tread or container zone of each tire. This deformation portion has an unloaded radius r as shown in the drawings and a radius under load of r''. The sidewall deformation is thus confined to a short arc of the sidewall between the tread and restrainers.

The difference r–r'' and the advantages in tire carrying capacity resulting therefrom are thereby improved.

A very important effect of the increment in the useful width of tread is added to the above effects and results. This increment in tread width does not adversely effect the limitation of the contained zone C (see e.g. FIG. 8), nor is it damaging from the viewpoint of crosswise stability of the tire, e.g. under stresses caused by the centrifugal force, side skids, crosswise road slope or the like. In accordance with another feature of the inventive tire and wheel, the tire can be fitted with one or more annular extensions 152 (see FIGS. 7 and 7A) which protect the tire deformation portion from lateral rubbings. The tire may also include inserted rings 162, 182 (See FIGS. 8 and 6 respectively) made of an elastomeric material and secured to an adjacent projection and/or rim of the wheel.

To take best advantage of the whole width of the tire tread from the viewpoint of carrying capacity, all stresses which are locally applied to the outer edges or apexes of the tread at, for example 122 of FIGS. 6–9, should be transmitted to portions of the tire, against which the inflation pressure is uniformly applied. For this reason, the apex or triangular shape with essentially diverging sections and a geometry shown for example in FIGS. 7 and 7A by 122 is particularly advantageous.

On the other hand, it is to be taken in mind that all portions of elastomeric mass which are adjacent the tread should be able to perimetrically bend even if by a small amount only, for adaptation to the ground under load. Therefore, the elastomeric mass at the sections of apexes 122 should meet the conflicting requirements of a high hardness (to stand against the compressive loads) and of a very good hysteresis, to minimize the losses caused by dissipated deformation work (which is converted to heat), with consequent resistance to rolling.

According to another feature of the invention, the material continuity of the aforementioned elastomeric mass, which is thicker at the lateral extensions 122 in the parts circumscribed by the dot and dash line polygonal contours, is interrupted by a plurality of comb-like notches, arranged in radial planes around the tire, thereby to subdivide the originally solid section into a plurality of adjacent portions having smaller section, the mass being allowed therefore to bend at each of these notches, while the resistance to compression (which is exerted in each radial plane, i.e. in the direction of comb teeth) is not essentially prejudiced.

Complementarily to these notches or alternatively in place thereof, other means may be provided to impart suitable properties this elastomeric mass of the tread apexes to meet the conflicting requirements. Rubber parts of a different sort or rigid thread-like components can be for example inserted in these localized comb-like sections, with a suitable statistical distribution. Recourse can be made also to the insertion of metallic or non-metallic pieces, suitably distributed, spaced and directed, filling the spaces which, in the sections shown in FIGS. 6 to 8A, are circumscribed by the dot and dash contours.

These contours are as a rule polygonal (see FIGS. 7 and 7A) or approximately triangular, or they can be inscribed in a triangle having one side adjacent and nearly parallel to tread, and another side adjacent and nearly tangent to the inner curvature of the side wall, leaving the third side inclined, whereby to close the triangular contour. The purpose of such geometry is to ensure that the loads applied to the lateral apex portions of tread can be transmitted by the hardened elasstomer mass or by the heterogeneous structure by which the most part of the apexes is formed and that shall stand against the compression without prejudicing the flexural deformability of tire contour, in the most uniform possible manner to the inside of the tread, or more precisely to the chamber wherein the inflation pressure is maintained.

The foregoing provisions take the best advantage of the tread width available for the contact with the ground, to attain a decrease of the specific surface load which is applied to and resisted by the tread/ground interface.

A technical solution which is considered as particularly promising to ensure the best utilization of tread width is shown in FIGS. 9 and 9A and in more detail, with a few structural changes, in FIGS. 9B and 10 to 15.

According to this technical solution, which represents a complemental feature of the tire and wheel according to the invention, and which has proved to be particularly advantageous in tires for heavy loads (typically for bus, truck and the like), the comb-like sections contained in the apexes 122 are formed with notches and/or elements particularly of metal but possibly of another material having high rigidity and mechanical resistance, which are inserted therein. These elements can be essentially planar, as shown in FIGS. 10 and 14 and consist of plates 112 having an essentially triangular shape or at any rate a shape in conformity with said contours of FIGS. 6 and 8 and possibly formed with partly crosswise or circumferential extensions (element 112a in FIG. 11) or with perimetrical extensions (element 112b in FIG. 12), to allow a better support in the directions in which the stresses are applied. The elements may be parallel to crown-arranged notches 114 on the tread extensions at relatively small spacings, whereby to ensure a substantial continuity of the resistance to compression under the load which is distributed on the belt, while the elastomeric mass between the notches is able to flex as required for taking-up the deformations.

In FIGS. 9B, 13, 14 and 15 elements 112 and notches 114 are arranged in as many close together radial planes, thus forming a crown extending about the whole perimetrical development of the lateral extensions 122. The elements or the notches 114 can be uniformly symmetrically inclined in respect of the planes on either side of the tire. In FIG. 14 for example the said elements are contained in planes each forming an angle of 90° with the equatorial or symmetrical wheel plane orthogonal to the axis thereof. P—P is a plane parallel to the equatorial plane and the notches 114 along with the possibly present elements 112 might form in such a case an angle other than 90° in respect of said plane P—P. Obviously, such inclination may be symmetrically opposite on the other side of the wheel. In such a case the notches 114 being "fish-scales" arranged, when viewed by transparency from below the tread.

Similarly, such notches and/or elements might be positioned at an angle of 90° in respect of said equatorial plane, while not lying in planes radial to the wheel (a radial plane being denoted by R—R in FIG. 15), but uniformly forming an angle different from 0° with the radial plane by which they are intersected.

While the invention has been disclosed in detail with respect to certain non-restrictive examples thereof, various changes and modifications may be made by those skilled in the art, without departing from the spirit and scope of same invention, in particular as specified in one or more of the following claims.

I claim:

1. A pneumatic tire and wheel construction having a wheel with a rim portion and a tire with a carcass annularly disposed around the rim and engaged therewith to form an air space for pressurized air, comprising a tread portion of the tire carcass, a substantially inextensible belt in the carcass adjacent said tread portion, two beads of the tire carcass engaged with the wheel rim portion, and annular sidewalls extending between each of said beads and said tread portion curved convexly outwardly with a first radius when the tire and wheel is unloaded, a pair of annular substantially rigid deformation restraining members rigidly associated with the wheel rim portion extending toward said tread portion, each overlaying one of said beads and a substantial portion of one of said sidewalls, said restraining members each curved in substantial conformity with the curvature of said side walls, a portion of each of said sidewalls remaining uncovered by said restraining members comprising a deformation portion of said first radius when the tire and wheel is unloaded and of a second decreased radius when the tire and wheel is loaded, whereby a deflection of the tire carcass on the wheel due to a load is substantially confined to said deflection portion of each sidewall, said tread portion including lateral elastomeric mass portions extending outwardly of the connection between said sidewalls and said tread portion to widen said tread portion whereby an interface of said tread portion and a surface on which the tire and wheel construction rides is widened, each lateral elastomeric mass portion having a triangular cross-section with one side substantially parallel to said tread portion, one side substantially parallel to the plane of said side wall and a remaining side extending between an outer edge of said elastomeric mass portion and the sidewall, each of said elastomeric mass portions including a plurality of axially and radially extending circumferentially spaced slots whereby said mass portion is increased in flexibility in a circumferential direction.

2. A pneumatic tire and wheel construction according to claim 1 further including a flexible annular inserted ring connected between an outer lateral edge of said elastomeric mass portion and said deformation restraining member to cover and protect said deformation portion of said sidewalls.

3. A pneumatic tire and wheel construction according to claim 1, wherein said deformation portion of said sidewalls includes an outwardly projecting annular extension of elastomeric material for projecting said deformation portion.

4. A pneumatic tire and wheel construction according to claim 1, further including an elastomeric annular portion connected to and extending outwardly of said deformation restraining member for protecting said deformation portion of said sidewalls.

5. A pneumatic tire and wheel construction having a wheel with a rim portion and a tire with a carcass annularly disposed around the rim and engaged therewith to form an air space for pressurized air, comprising a tread portion of the tire carcass, a substantially inextensible belt in the carcass adjacent said tread portion, two beads of the tire carcass engaged with the wheel rim portion, and annular sidewalls extending between each of said beads and said tread portion curved convexly outwardly with a first radius when the tire and wheel is unloaded, a pair of annular substantially rigid deformation restraining members rigidly associated with the wheel rim portion extending toward said tread portion, each overlaying one of said beads and a substantial portion of one of said sidewalls, said restraining members each curved in substantial conformity with the curvature of said sidewalls, a portion of each of said sidewalls remaining uncovered by said restraining members comprising a deformation portion of said first radius when the tire and wheel is unloaded and of a second decreased radius when the tire and wheel is loaded, whereby a deflection of the tire carcass on the wheel due to a load is substantially confined to said deflection portion of each sidewall, said tread portion including lateral elastomeric mass portions extending outwardly of the connection between said side walls and said tread portion to widen said tread portion whereby an interface of said tread portion and a surface on which the tire and wheel construction rides is widened, each lateral elastomeric mass portion having a triangular cross-section with one side substantially parallel to said tread portion, one side substantially parallel to the plane of said sidewall and a remaining side extending between an outer edge of said elastomeric mass portion and the sidewall, each of said lateral elastomeric mass portions including a plurality of circumferentially spaced substantially rigid triangular elements embedded therein whereby said mass portions are increased in their radial rigidity.

6. A tire and wheel construction according to claim 5 wherein each of said lateral elastomeric mass portions includes a plurality of circumferentially spaced notches disposed between said substantially rigid triangular elements.

7. A pneumatic tire and wheel construction according to claim 6 wherein each of said rigid elements includes at least one circumferentially extending portion.

8. A pneumatic tire and wheel construction according to claim 7 wherein each of said circumferentially extending portions of said rigid elements extends circumferentially about the entire periphery of said rigid elements.

* * * * *